United States Patent
Spann

(10) Patent No.: US 12,545,011 B2
(45) Date of Patent: Feb. 10, 2026

(54) METHODS OF PREPARING METAL SHEETS FOR A DCB / DAB SUBSTRATE BONDING PROCESS

(71) Applicant: Littelfuse, Inc., Chicago, IL (US)

(72) Inventor: Thomas Spann, Chicago, IL (US)

(73) Assignee: Littelfuse, Inc., Rosemont, IL (US)

( * ) Notice: Subject to any disclaimer, the term of this patent is extended or adjusted under 35 U.S.C. 154(b) by 160 days.

(21) Appl. No.: 18/486,643

(22) Filed: Oct. 13, 2023

(65) Prior Publication Data
US 2025/0121587 A1   Apr. 17, 2025

(51) Int. Cl.
| | |
|---|---|
| *B22F 1/14* | (2022.01) |
| *B23K 35/02* | (2006.01) |
| *B32B 15/20* | (2006.01) |
| *B32B 18/00* | (2006.01) |
| *B32B 37/06* | (2006.01) |
| *C04B 37/02* | (2006.01) |
| *C23C 4/11* | (2016.01) |

(52) U.S. Cl.
CPC ................ *B32B 15/20* (2013.01); *B22F 1/14* (2022.01); *B23K 35/0244* (2013.01); *B32B 18/00* (2013.01); *B32B 37/06* (2013.01); *C04B 37/023* (2013.01); *C23C 4/11* (2016.01); *B22F 2201/03* (2013.01); *B22F 2201/50* (2013.01); *C04B 2237/06* (2013.01); *C04B 2237/124* (2013.01); *C04B 2237/366* (2013.01); *C04B 2237/407* (2013.01)

(58) Field of Classification Search
CPC .... B22F 1/14; B22F 2201/03; B22F 2201/50; C23C 4/11; C04B 2237/06; C04B 2237/124
See application file for complete search history.

(56) References Cited

U.S. PATENT DOCUMENTS

| | | | |
|---|---|---|---|
| 4,854,495 A | 8/1989 | Yamamoto | |
| 2002/0140134 A1 | 10/2002 | Topitsch | |
| 2019/0153730 A1* | 5/2019 | Sager | .................... E04D 13/076 |
| 2020/0006168 A1 | 1/2020 | Terasaki | |

FOREIGN PATENT DOCUMENTS

| | | | | |
|---|---|---|---|---|
| CN | 208808153 U | 5/2019 | | |
| DE | 10033988 A1 | 3/2001 | | |
| DE | 102010025311 A1 | 12/2011 | | |
| WO | WO-2021122035 A1 * | 6/2021 | ........... | C04B 37/021 |

OTHER PUBLICATIONS

English machine translation of DE10033988 (Year: 2001).*
English machine translation of WO2021122035 (Year: 2021).*
International Search Report and Written Opinion for International Application No. PCT/US2024/050908, dated Feb. 5, 2025, 6 pages.

* cited by examiner

*Primary Examiner* — Scott W Dodds
(74) *Attorney, Agent, or Firm* — KDW Firm PLLC

(57) ABSTRACT

Novel methods of preparing a metal bonded substrate. A method may include providing a ceramic substrate, the ceramic substrate comprising a ceramic body. The method may include bonding a thick metal sheet to the ceramic substrate, wherein the bonding comprises forming a metal oxide layer by powder deposition on a metal surface, and bringing the ceramic substrate and thick metal sheet together, wherein the metal oxide layer and the thick metal sheet interact to form an interface layer between the thick metal sheet and the ceramic substrate, after the bonding.

8 Claims, 7 Drawing Sheets

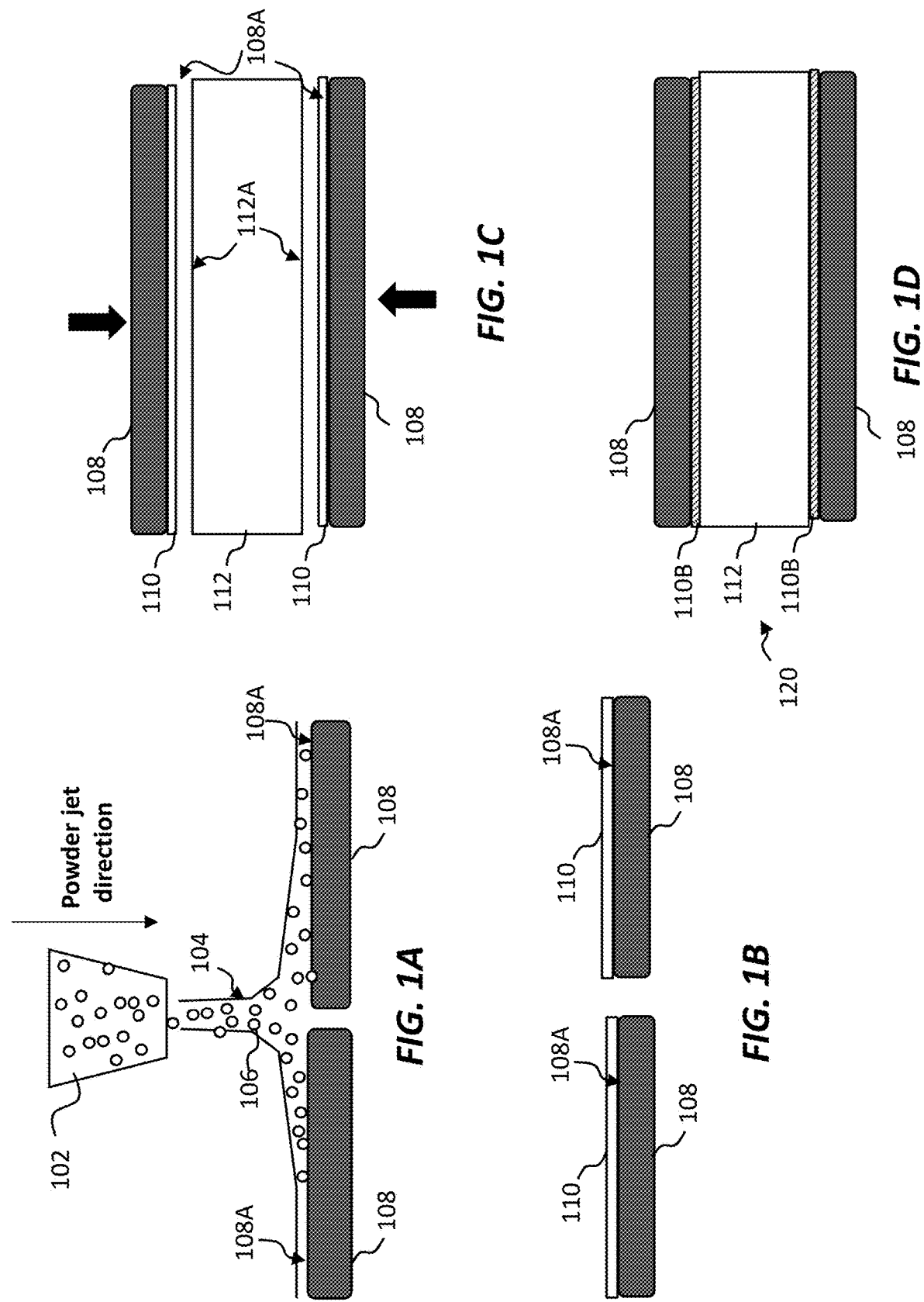

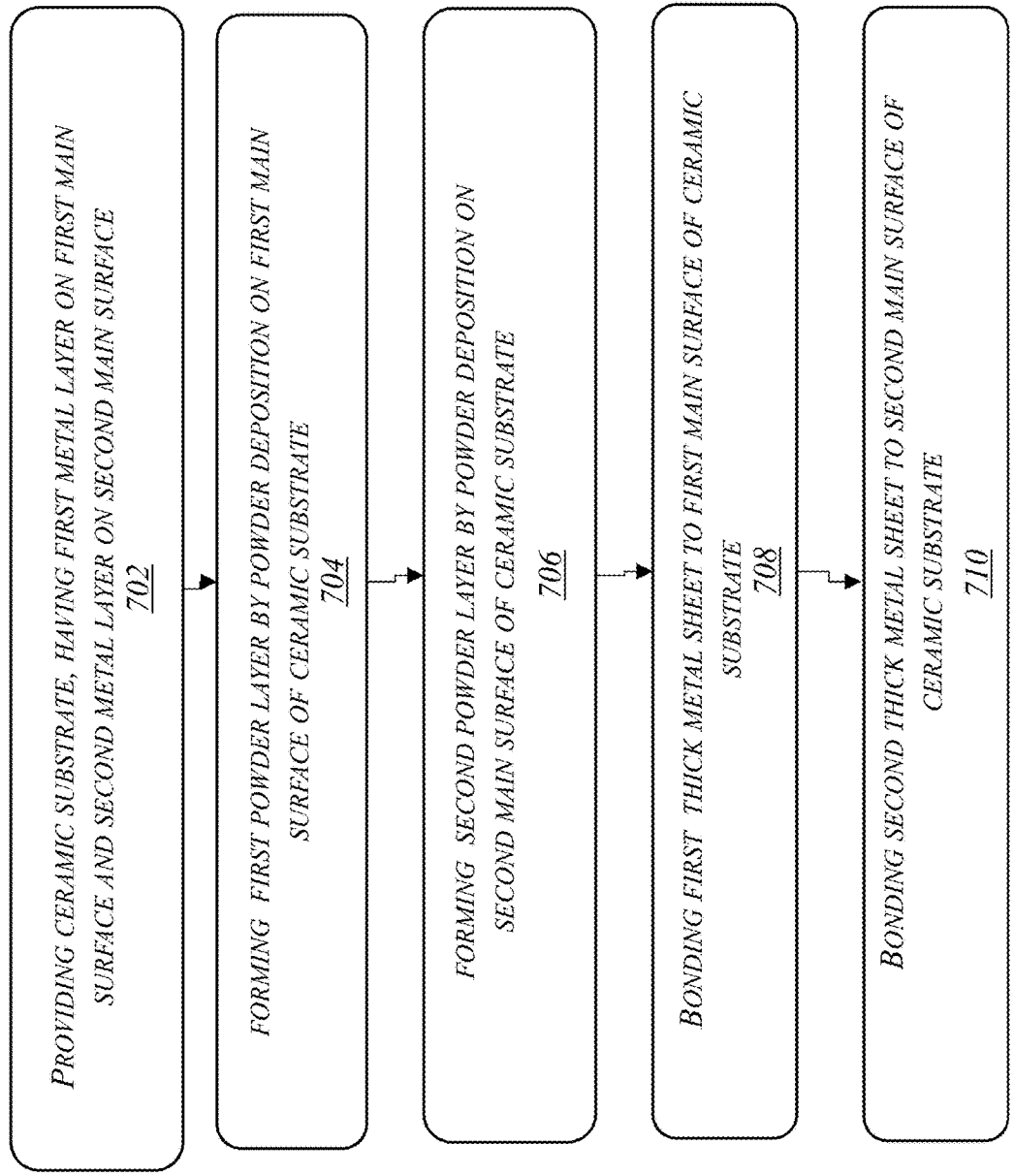

METHODS OF PREPARING METAL SHEETS FOR A DCB / DAB SUBSTRATE BONDING PROCESS

BACKGROUND

Field

Direct bonded copper (DCB) substrates are common components that are used to support semiconductor substrates, especially in power semiconductor modules. Such DCB substrates are arranged as a sandwich that includes three layers: an electrical insulation layer (center), formed from a ceramic body, and two outer layers having high electric and thermal conductivity. Cu is widely used (DCB). Aluminum may be used as an alternative material for Cu (where the substrate may be termed a DAB). One metal layer forms the top layer, on a first main surface of the ceramic body, while the other metal layer is formed on the second main surface. These DCBs are fabricated by a well-known mastercard bonding process. There are several known techniques and processes to generate the aforementioned metal-ceramic-metal sandwich that forms the DCB. A common approach is to apply a metal-oxide between the metal and the ceramic. A widely used technique is a wet-chemical process to form and to bring the metal oxide onto the metal surface before bonding the metal sheet to the ceramic sheet.

In sum, the main operations in the mastercard process include 1) preparation of the metal sheets; 2) oxidation of the metal sheets; 3) drying of the metal sheets; 4) stacking of the sandwich (metal, ceramic, metal); and 5) a bonding process at high temperature to bond the metal sheets to the ceramic body, which temperature may be close to the melting temperature of the metal used in the metal sheets.

In view of the above, the main operations involved in fabricating a DCB include a chain of a wet-chemical process steps with numerous cleaning, rinsing and activating procedures. It remains a challenge to form a uniform metal-oxide layer, while the quality of the layer depends on the throughput and quality of the cleaning, rinsing and activating steps. The metal-oxide is formed inside a wet process at elevated temperatures, and depends on many parameters, which parameters ideally need to be kept constant. Another challenge is to keep all rinsing solutions clean and uniform. In addition to process at elevated temperatures, the combination of humidity and hazardous substances present a challenge to the operator, the equipment and the exhaust and cleaning system.

BRIEF SUMMARY

In one embodiment, a method of preparing a metal bonded substrate is provided. The method may include providing a ceramic substrate, the ceramic substrate comprising a ceramic body. The method may include bonding a thick metal sheet to the ceramic substrate, wherein the bonding comprises forming a metal oxide layer by powder deposition on a metal surface, and bringing the ceramic substrate and thick metal sheet together, wherein the metal oxide layer and the thick metal sheet interact to form an interface layer between the thick metal sheet and the ceramic substrate, after the bonding.

In another embodiment, a method of preparing a direct copper bonded (DCB) substrate is provided. The method may include providing a ceramic substrate, the ceramic substrate comprising a ceramic body. The method may also include bonding a thick copper sheet to the ceramic substrate, wherein the bonding comprises forming a metal oxide layer by powder deposition on a copper surface. The method may further include bringing the ceramic substrate and thick copper sheet together, wherein the metal oxide layer and the copper sheet interact to form an interface layer between the thick copper sheet and the ceramic substrate, after the bonding.

In another embodiment, a method of preparing a direct aluminum bonded (DAB) substrate may include providing a ceramic substrate, bonding a thick aluminum sheet to the ceramic substrate, wherein the bonding comprises forming an Al—Si layer by powder deposition on an aluminum surface, and bringing the ceramic substrate and thick aluminum sheet together, wherein the Al—Si layer forms an interface layer between the thick aluminum sheet and the ceramic substrate, during the bonding.

BRIEF DESCRIPTION OF THE DRAWINGS

FIG. 1A to FIG. 1D show a sequence of operations for preparing a metal bonded substrate, according to embodiments of the disclosure;

FIG. 7 shows another exemplary process flow, according to other embodiments of the disclosure.

DESCRIPTION OF EMBODIMENTS

Figure 2A:
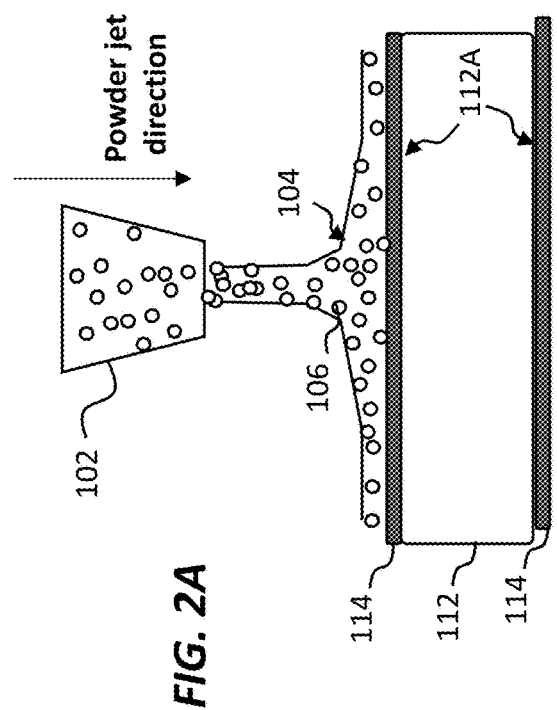
FIG. 2A to FIG. 2D show a sequence of operations for preparing a metal bonded substrate, according to additional embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In the present embodiments, novel dry application techniques are used to treat a metal surface, to aid in bonding a metal sheet to a ceramic body. In particular embodiments, a dry application process involves a powder application process, that forms a powder coating process. In various embodiment, the powder may be a metal oxide or an assemblage of particles that include a mixture of metal-oxide and metal. In particular embodiments, a metal powder may be applied to a substrate in an oxidizing ambient to generate an oxide as applied.

Turning to FIG. 1A to FIG. 1D there is shown a sequence of operations for preparing a metal bonded substrate, according to embodiments of the disclosure. These operations may apply to forming a DCB substrate or a direct aluminum bonded (DAB) substrate in different embodiments. In FIG. 1A, there are shown two thick metal sheets, shown as metal sheets 108. These sheets may represent copper sheets or aluminum sheets according to different non-limiting embodiments. In various non-limiting embodiments, the thickness of these sheets may range between 0.1 and 1.0 mm. A powder source 102 is arranged to apply a powder stream 104 to the sheets 108. The powder stream 104 may contain individual particles, shown as particles 106. The application of powder stream 104 to the metal sheets 108 may represent a variant of a known powder coating process. As one non-limiting example, a common and cost-efficient technology for powder application is to employ an air gun-like equipment, which apparatus transports the powder stream 104 to on a first main surface 108A using electrostatic force to attach the powder onto the metal surface of the sheets 108.

As shown in FIG. 1B, the powder stream 104 may condense into a layer, referred to a powder layer 110, that forms on the first main surface 108A of the metal sheets 108. Note that the term 'powder layer' may simply denote that the layer is formed from a powder precursor, while the powder layer 110 is nonetheless an agglomeration of particles, a semicontinuous layer, a continuous layer or film that no longer consists of isolated particles.

According to various embodiments of the disclosure, the powder layer 110 may have a thickness of <=10 μm. In embodiments where the metal sheets 108 are copper sheets, the powder layer 110 may be a copper oxide layer, for example. Likewise, in embodiments where the metal sheets 108 are aluminum sheets, the powder layer 110 may be an aluminum-silicon layer, suitable for reacting with a suitable ceramic substrate, for example.

Turning to FIG. 1C there is shown a further operation where the metal sheets 108 are brought into contact with a ceramic substrate 112. The ceramic substrate may be an aluminum-oxide substrate (such as $Al_2O_3$) or aluminum-nitride (such as AlN) substrate or silicon-nitride substrate (such as $Si_3N_4$) according to various non-limiting embodiments, and may have a thickness between 0.125 mm and 1 mm in some non-limiting embodiments. In the operation of FIG. 1C, the first main surface 108A (now including powder layer 110) of each of two of the metal sheets 108 is brought into contact with main surfaces 112A of ceramic substrate 112, so as to bond the metal sheets 108 onto opposite main surfaces of the ceramic substrate 112. Note that in this operation, the bonding may be performed at elevated temperature, slightly lower than the melting temperature of the metal sheets 108. For example, in the case of copper sheets, the bonding may take place at approximately 1070° C. Moreover, the operation of bonding the top one of the metal sheets 108 to the ceramic substrate 112 may be performed separately to the operation of bonding the bottom one of the metal sheets 108 to the ceramic substrate 112.

In various embodiments, the elevated temperature for bonding may be performed according to the following protocol. The elevated temperature may be selected so as to promote formation of a liquid material at the interface region formed between the metal sheet 108 and the ceramic substrate 112. In particular, the elevated temperature may be selected to be greater than or equal to the melting temperature of a eutectic compound that forms between the metal sheet 108 and material of the powder layer 110. As an example, copper oxide is known to form a eutectic material with copper metal at a given overall composition in the binary phase system of copper and copper oxide (copper and oxygen), approximately 1065° C. Thus, the bonding temperature of the operation of FIG. 1C may be set to 1065° C. to 1075° C. in some non-limiting embodiments, so as to promote formation of a eutectic material and melting of that eutectic material, while preserving the bulk of the metal sheet 108 as a solid piece. In this manner, a densified and well bonded interface may form between the metal sheet 108 and the ceramic substrate 112.

As another example, Al—Si materials may form an eutectic having a lower melting temperature than aluminum metal. For example, the known Al—Si binary phase diagram exhibits an Al—Si eutectic mixture (approximately 12.6 weight percent silicon) having a melting temperature of 577° C., while the melting temperature of pure aluminum is 660 C. Thus in the case of a thick metal sheet of aluminum, and a powder layer of Al—Si, the bonding temperature of the operation of FIG. 1C may be set to 580° C. to 650° C. in some non-limiting embodiments, so as to promote formation of an eutectic AlSi material and melting of that eutectic material, while preserving the bulk of the metal sheet 108 as a solid piece. In this manner, a densified and well bonded interface may form between the metal sheet 108 and the ceramic substrate 112.

Turning to FIG. 1D there is shown a final structure of a DCB substrate 120, after the bonding operation of FIG. 1C is completed. At this stage, an interface layer 110B may have formed between the ceramic substrate 112 and metal sheets 108, which interface layer serves to form a strong bond between the metal sheets 108 and ceramic substrate 112.

Turning to FIG. 2A to FIG. 2D there is shown a sequence of operations for preparing a metal bonded substrate, according to additional embodiments of the disclosure. These operations may apply to forming a DCB substrate or a direct aluminum bonded (DAB) substrate in different embodiments. In FIG. 2A, there is shown a ceramic substrate 112, having a metal layer 114, attached on each of the main surfaces 112A of the ceramic substrate 112. For example, the metal layer 114 may be co-fired, sintered or otherwise bonded to the main surfaces 112A. The use of a co-fired substrate with an existing metal layer instead of a bare ceramic such as cera,oc substrate 112 provides flexibility for choice of substrates for bonding the substrate to a thick metal sheet. In this example the metal layer 114 may be substantially thinner than the thickness of the metal sheets 108, described previously. In various non-limiting embodiments, the metal layer 114 may be less than 100 μm thick, and in various embodiments less than 20 μm thick.

In particular embodiments, the metal layer 114 may be a multi-layer stack, formed of several different metal layers or sub-layers, as known in the art. For example, turning to FIG.

2E, there is shown a variant of the metal layer 114, having an inner layer 114A nearest the ceramic substrate 112, an intermediate layer 114B, and an outer layer 114C. In one non-limiting embodiment, the inner layer 114A may be a tungsten layer, having a thickness of several micrometers, such as 20 μm, the intermediate layer 114B may be a nickel layer having a thickness of less than 5 μm, such as 2 μm, and the outer layer 114C may be a copper layer having a thickness of less than 5 μm, such as 2 μm.

As with the embodiment of FIGS. 1A-1D, a powder source 102 is arranged to apply a powder stream 104, formed of the particles 106, in this case, directly onto the metal layers 114. Note that the operation of FIG. 2A depicts application of the powder stream 104 to just one of the metal layers 114. However, the ceramic substrate 112 or powder source 102 may be moved in order to apply the powder stream 104 to both of the metal layers 114.

Figure 2C:
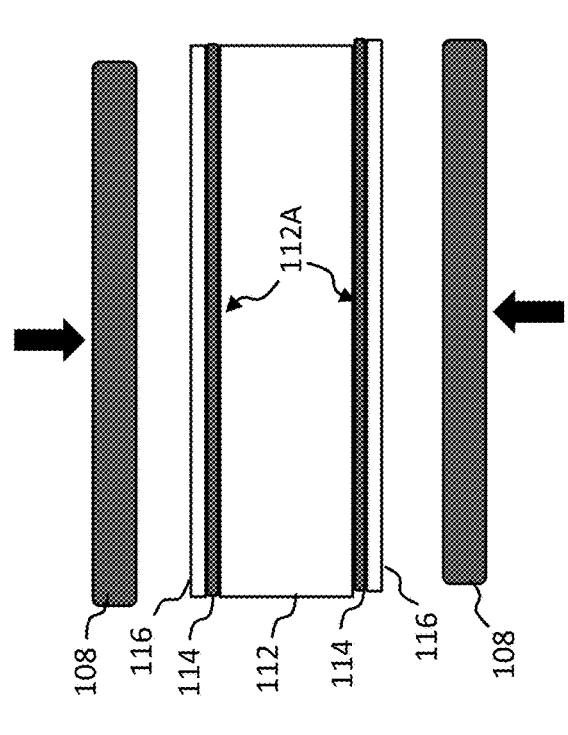
Figure 2B:
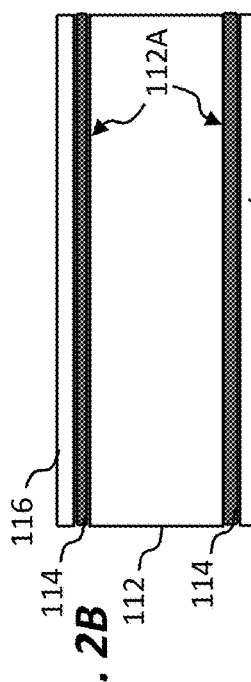

As shown in FIG. 2B, after the operation of FIG. 2A, the powder stream 104 may condense into a powder layer 116, that forms above the main surfaces 112A of the ceramic substrate 112, and directly upon the metal layers 114.

Turning to FIG. 2C there is shown a further operation where the metal sheets 108 are brought into contact with a ceramic substrate 112. The ceramic substrate 112 may be an aluminum oxide substrate, aluminum nitride substrate, or silicon nitride substrate according to various non-limiting embodiments. In the operation of FIG. 2C, the main surfaces 112A of the ceramic substrate, each include a layer stack, formed of the metal layer 114 and powder layer 116. Thus, the metal sheets 108 are brought into direct contact with the powder layer 116, so as to bond the metal sheets 108 onto opposite main surfaces of the ceramic substrate 112. Note that in this operation, the bonding may be performed at elevated temperature, slightly lower than the melting temperature of the metal sheets 108. For example, in the case of copper sheets, the bonding may take place at approximately 1070° C. More generally, the bonding temperature may be selected to promote formation of a melted eutectic layer based upon the particular material system of the metal sheet 108 and powder layer 116, so as to promote a solid bond after the complete stack of bonded material is cooled down to room temperature.

Figure 2D:
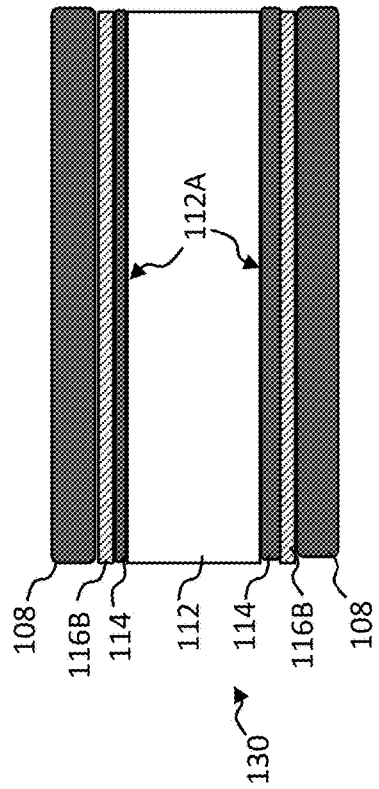
Figure 2E:
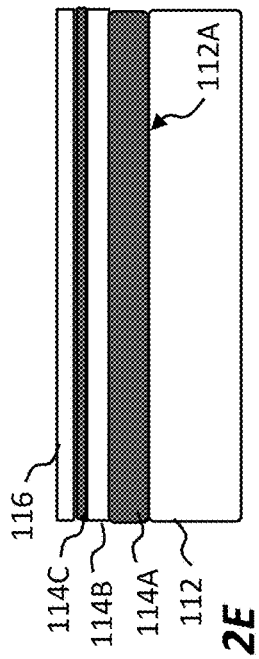
FIG. 2E, shows a variant of the metal layer of FIG. 2A.

Turning to FIG. 2D there is shown a final structure of a DCB substrate 130, after the bonding operation of FIG. 2C is completed. At this stage, an interface layer 116B may have formed between the ceramic substrate 112 (incorporating the metal layers 114) and metal sheets 108, which interface layer serves to form a strong bond between the metal sheets 108 and ceramic substrate 112.

Figure 3:
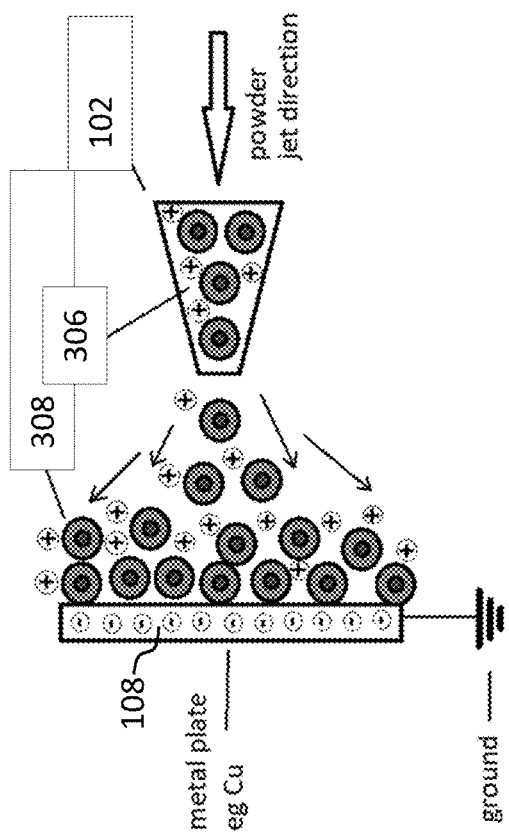
FIG. 3 shows one variant of a method for forming a DCB, according to embodiments of the disclosure.

Turning to FIG. 3 there is shown one variant of a method for forming a DCB, according to embodiments of the disclosure. In FIG. 3, a powder source 102 is pictured having a powder 306 that may be charged, as represented by the positive charge. The powder source 102 may represent a powder jet apparatus that transports the powder 306 to a metal sheet 108, as generally described previously. In this particular embodiment, the powder 306 is formed of a metal core that is surrounded by an oxide shell. The metal sheet 108 may be grounded and may develop a negative charge that aids in the condensation of the powder 306 into a powder layer 308. In particular embodiments, the metal sheet 108 may be oriented so that the force of gravity and electrostatic adsorption can be used to reach a uniform coating quality.

Figure 4:
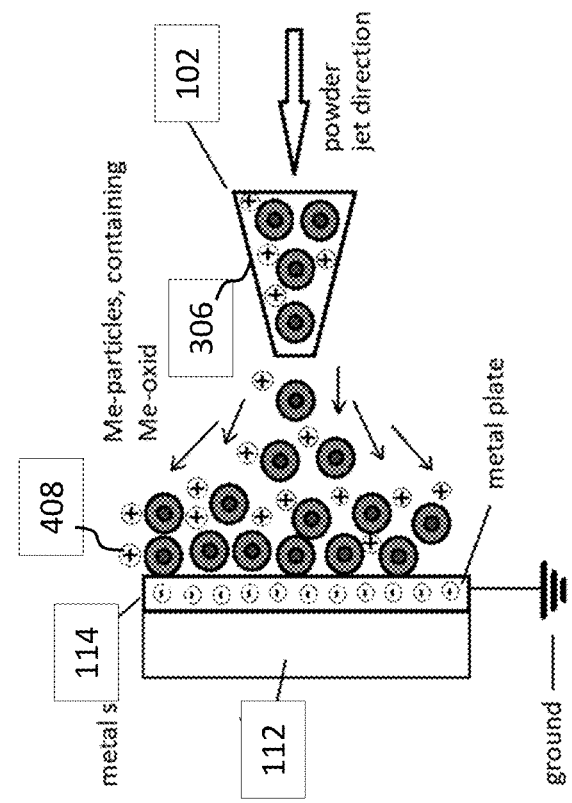
FIG. 4 shows another variant of a method for forming a DCB, according to embodiments of the disclosure.

Turning to FIG. 4 there is shown another variant of a method for forming a DCB, according to embodiments of the disclosure. In FIG. 4, a powder source 102 is pictured having a powder 306 that may be charged, as represented by the positive charge. The powder source 102 may represent a powder jet apparatus that transports the powder 306 to a metal layer 114, as generally described previously. In this particular embodiment, the powder 306 is formed of a metal core that is surrounded by an oxide shell. Note that the metal layer 114, being disposed on the ceramic substrate 112, may also be grounded and may develop a negative charge that aids in the condensation of the powder 306 into a powder layer 408. In particular embodiments, the metal sheet 108 may be oriented so that the force of gravity and electrostatic adsorption can be used to reach a uniform coating quality.

In alternative embodiments for forming a DAB substrate, the powder 306 may be formed of an aluminum core surrounded by an Al—Si shell, for example.

While the embodiments of FIG. 3 and FIG. 4 illustrate the use of a composite powder with a metal core and oxide shell, in other embodiments, a powder source may employ a powder that is an assembly of homogeneous oxide particles, or an assembly of metal particles.

Figure 5A:
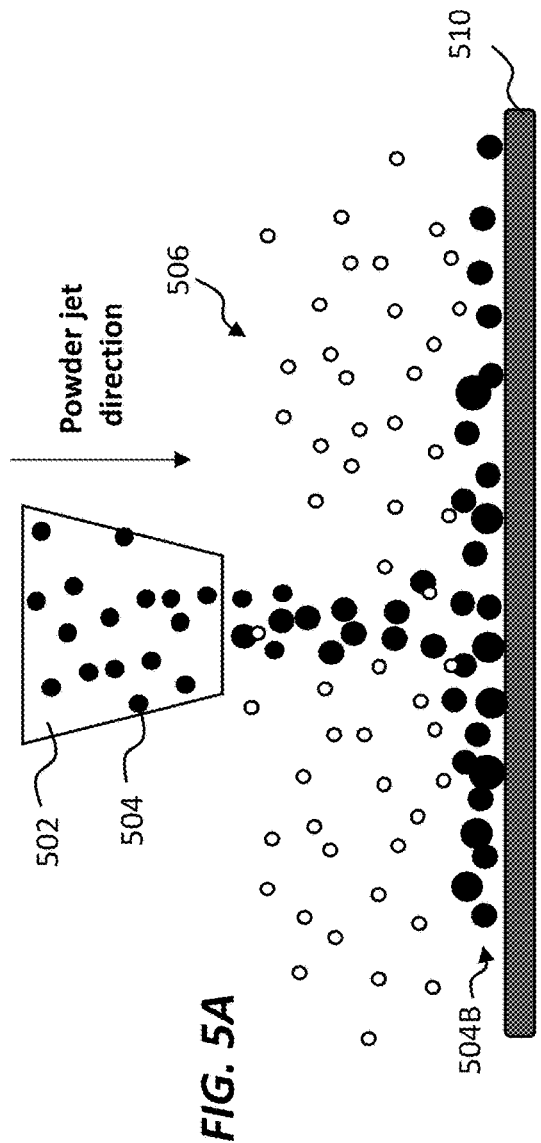
FIG. 5A shows another variant of a method for forming a DCB, according to embodiments of the disclosure.

Turning to FIG. 5A there is shown another variant of a method for forming a DCB, according to embodiments of the disclosure. In this example, a powder source 502 is supplied with a metal powder 504. The metal powder 504 is directed to a metal surface 510, which surface may represent a variant of the metal sheet 108 or metal layer 114, according to different embodiments. The metal powder 504 may be directed through an oxidizing ambient 506, where the oxidizing ambient 506 may partially or fully oxidize the metal powder 504 such that the particles of metal powder 504 develop an oxide shell, as shown in FIG. 5A. As such, a powder layer 504B may be deposited, representing an oxide layer, or partially oxidized layer.

Figure 5B:
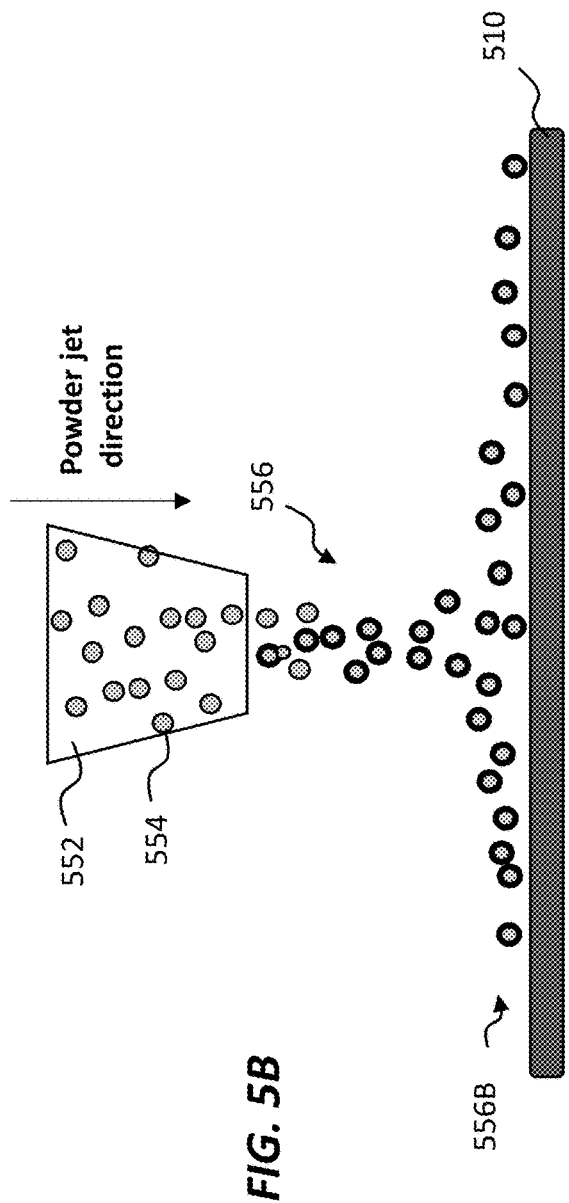
FIG. 5B shows a further variant of a method for forming a DCB, according to additional embodiments of the disclosure.

Turning to FIG. 5B there is shown another variant of a method for forming a DCB, according to additional embodiments of the disclosure. In this example, a powder source 552 is supplied with an metal oxide powder 554. The metal oxide powder 554 is directed as metal oxide particles 556 to a metal surface 510, which surface may represent a variant of the metal sheet 108 or metal layer 114, according to different embodiments. As such a powder layer 556B may be deposited, representing an oxide layer.

Figure 5C:
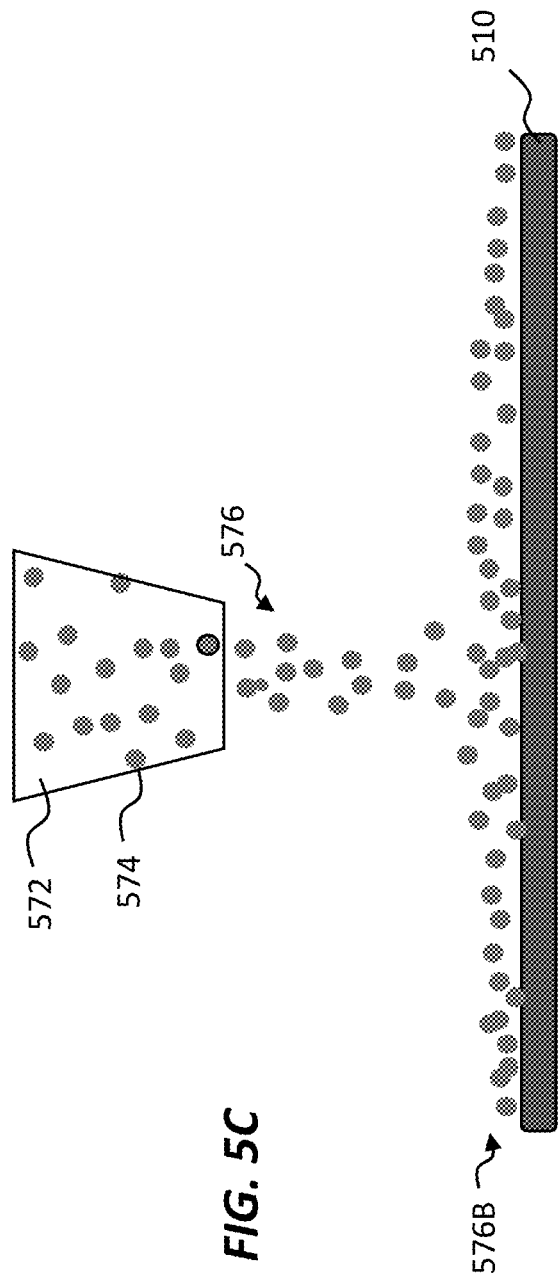
FIG. 5C shows an additional variant of a method for forming a DCB, according to additional embodiments of the disclosure.

Turning to FIG. 5C there is shown another variant of a method for forming a metal-ceramic-metal sandwich (DCB or DAB), according to additional embodiments of the disclosure. In this example, a powder source 572 is supplied with a compound powder 574, such as aluminum-silicon compound or alloy. The compound powder 574 is formed from compound particles 576 that are directed to a metal surface 510, which surface may represent a variant of the metal sheet 108 or metal layer 114, according to different embodiments. As such, a powder layer 576B may be deposited, representing a compound layer. In particular embodiments, where the compound powder is as aluminum-silicon compound or alloy, the metal surface 510 may represent an aluminum layer, disposed on a ceramic substrate (not shown), or a thick aluminum sheet that is free-standing.

Figure 6:
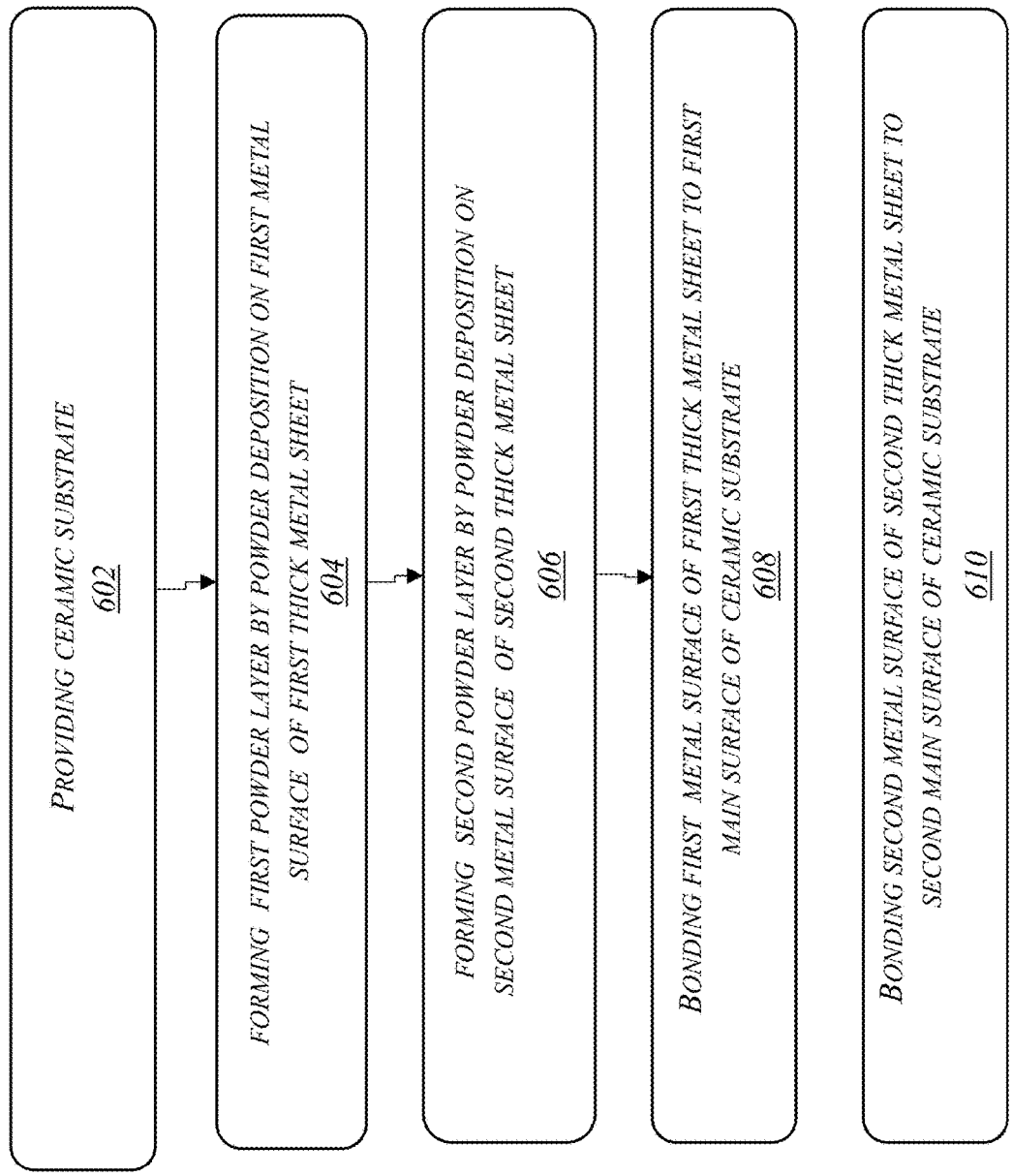
FIG. 6 shows an exemplary process flow, according to some embodiments of the disclosure.

FIG. 6 presents a process flow 600 in accordance with embodiments of the disclosure. At block 602, a ceramic substrate is provided. In different embodiments, the ceramic substrate may be an aluminum oxide material, aluminum nitride, or silicon nitride material.

At block 604, a first powder layer is formed by powder deposition on a first metal surface of a first thick metal sheet. According to various embodiments, the first powder layer may constitute a fully oxidized powder material or a partially oxidized powder material. In some embodiments, the first thick metal sheet may be a copper sheet, while the oxide layer contains a copper oxide material. In some embodiments, the thick metal sheet may be pure aluminum metal and the first powder layer may be an Al—Si alloy powder layer.

In block 606, a second powder layer is formed by powder deposition on a second metal surface of a second thick metal sheet. According to various embodiments, the second powder layer may constitute a fully oxidized powder material or a partially oxidized powder material. In some embodiments, the second thick metal sheet may be a copper sheet, while the oxide layer contains a copper oxide material. According to various embodiments, a first oxide layer and a second oxide layer may be formed using an initial powder in a powder source that is an oxide powder, a metal powder, or a composite powder that includes a metal core and oxide shell. In embodiments of a metal powder, the metal powder may be at least partially oxidized before condensing to form the first oxide layer or second oxide layer. In some embodiments, the thick metal sheet may be pure aluminum metal and the second powder layer may be an Al—Si powder layer. According to various embodiments, the powder layer for the operations of block 604 and block 606 may be applied by spraying techniques at room temperature.

At block 608, the first metal surface of the first thick metal sheet is bonded to a first main surface of a ceramic substrate. At block 610, the second metal surface of the second thick metal sheet is bonded to a second main surface of the ceramic substrate. In some embodiments, the bonding of the first thick metal sheet and the bonding of the second thick metal sheet may take place sequentially to one another, or may take simultaneously with one another. According to various embodiments, the bonding of the first thick metal sheet and second thick metal sheet may take place at elevated temperatures, such as slightly below the melting temperature of the first thick metal sheet and second thick metal sheet, and at or above the melting temperature of a eutectic compound formed by reaction of the thick metal sheet and respective first powder layer and second powder layer.

FIG. 7 presents a process flow 700 in accordance with other embodiments of the disclosure. At block 702, a ceramic substrate is provided, where the ceramic substrate has a first metal layer on a first main surface and a second metal layer on a second main surface. The first metal layer and the second metal layer may have a thickness of <=100 µm each, according to some non-limiting embodiments.

At block 704, a first powder layer is formed on a first main surface of the ceramic substrate, by powder deposition.

At block 706, a second powder layer is formed on a second main surface of the ceramic substrate, by powder deposition.

At block 708 a first thick metal sheet is bonded to the first main surface of the ceramic substrate. At block 710, a second thick metal sheet is bonded to a second main surface of the ceramic substrate. In some embodiments, the bonding of the first thick metal sheet and the bonding of the second thick metal sheet may take place sequentially to one another, or may take simultaneously with one another. According to various embodiments, the bonding of the first thick metal sheet and second thick metal sheet may take place at elevated temperatures, such as slightly below the melting temperature of the first thick metal sheet and second thick metal sheet, and at or above the melting temperature of a eutectic compound formed by reaction of the thick metal sheet and respective first powder layer and second powder layer.

In the process flow of FIG. 7, like that of FIG. 6, the powder layers may be formed of an oxide, such as copper oxide, or an Al—Si compound, according to different non-limiting embodiments.

While the present embodiments have been disclosed with reference to certain embodiments, numerous modifications, alterations, and changes to the described embodiments are possible while not departing from the sphere and scope of the present disclosure, as defined in the appended claims. Accordingly, the present embodiments are not to be limited to the described embodiments and may have the full scope defined by the language of the following claims, and equivalents thereof.

What is claimed is:

1. A method of preparing a metal bonded substrate, comprising:
   providing a ceramic substrate, the ceramic substrate comprising a ceramic body; and
   bonding a thick metal sheet to the ceramic substrate, wherein the bonding comprises forming a metal oxide layer by powder deposition on a metal surface, and bringing the ceramic substrate and thick metal sheet together, wherein the metal oxide layer and the thick metal sheet interact to form an interface layer between the thick metal sheet and the ceramic substrate, after the bonding;
   wherein the metal surface is a first main surface of the thick metal sheet and wherein the powder deposition process comprises spraying a powder onto the first main surface to form the metal oxide layer;
   wherein bringing the ceramic substrate and thick metal sheet together comprises, after the spraying the powder, applying the first main surface to the ceramic substrate at elevated temperature; and
   wherein spraying of the powder comprises spraying a metallic powder onto the first main surface in an oxidizing ambient, wherein the metallic powder is oxidized during the spraying.

2. The method of claim 1, wherein the metal oxide layer and the thick metal sheet interact to form a eutectic compound, wherein the elevated temperature is greater than or equal to a melting temperature of the eutectic compound, and wherein the elevated temperature is less than a melting temperature of the thick metal sheet.

3. The method of claim 1, wherein the oxidizing ambient causes the metallic powder to spray as an oxide material onto the first main surface.

4. The method of claim 1, wherein the oxidizing ambient causes the metallic powder to spray as a metal core that is surrounded by an oxide shell onto the first main surface.

5. A method of preparing a direct copper bonded (DCB) substrate, comprising:
   providing a ceramic substrate, the ceramic substrate comprising a ceramic body; and
   bonding a thick copper sheet to the ceramic substrate, wherein the bonding comprises forming a metal oxide layer by powder deposition on a copper surface, and bringing the ceramic substrate and thick copper sheet together, wherein the metal oxide layer and the thick copper sheet interact to form an interface layer between the thick copper sheet and the ceramic substrate, after the bonding;
   wherein the copper surface is a first main surface of the thick copper sheet and wherein the powder deposition process comprises spraying a powder onto the first main surface to form the metal oxide layer;

wherein bringing the ceramic substrate and thick copper sheet together comprises, after the spraying the powder, applying the first main surface to the ceramic substrate at elevated temperature; and wherein spraying of the powder comprises spraying a metallic powder onto the first main surface in an oxidizing ambient, wherein the metallic powder is oxidized during the spraying.

6. The method of claim 5, wherein the metal oxide layer and the thick copper sheet interact to form a eutectic compound, wherein the elevated temperature is greater than or equal to a melting temperature of the eutectic compound, and wherein the elevated temperature is less than a melting temperature of the thick copper sheet.

7. The method of claim 1, wherein the oxidizing ambient causes the metallic powder to spray as a copper oxide material onto the first main surface.

8. The method of claim 1, wherein the oxidizing ambient causes the metallic powder to spray as a copper core that is surrounded by a copper oxide shell onto the first main surface.

\* \* \* \* \*